United States Patent [19]

Borman

[11] 4,257,929

[45] Mar. 24, 1981

[54] POLY(BUTYLENE TEREPHTHALATE) MOLDING RESIN

[75] Inventor: Willem F. H. Borman, Evansville, Ind.

[73] Assignee: General Electric Company, Pittsfield, Mass.

[21] Appl. No.: 67,015

[22] Filed: Aug. 16, 1979

[51] Int. Cl.³ ............................................. C08L 67/00
[52] U.S. Cl. .................................................. 260/40 R
[58] Field of Search ...................... 260/40 R; 525/165; 428/407

[56] References Cited

U.S. PATENT DOCUMENTS

| | | |
|---|---|---|
| 2,465,319 | 3/1949 | Whinfield et al. |
| 3,080,258 | 3/1963 | Davis ............................ 428/407 X |
| 3,407,539 | 7/1962 | Pengilly . |
| 3,671,487 | 6/1972 | Abolins ............................ 525/165 X |
| 3,812,077 | 5/1974 | Hobles ............................ 260/40 R |
| 3,992,558 | 11/1976 | Smith-Johannsen ............ 428/407 X |
| 4,111,893 | 9/1978 | Gasman et al. .................... 260/40 R |
| 4,115,333 | 9/1978 | Phipps et al. ...................... 260/22 R |
| 4,124,561 | 11/1978 | Phipps et al. ...................... 260/40 R |

OTHER PUBLICATIONS

"Low-Cost Suzorite Mica Flake Prevents Distortion in PBT", Marietta Resources (Aug. 1976), 2 pages.

*Primary Examiner*—Lewis T. Jacobs
*Attorney, Agent, or Firm*—Morgan, Finnegan, Pine, Foley & Lee

[57] ABSTRACT

Poly(1,4-butylene terephthalate) resins filled with mineral fillers show substantial improvement in impact strength, distortion temperature under load, and flexural strength if the individual particles of the filler, e.g., mica, are coated with unsintered poly(tetrafluoroethylene) resin.

4 Claims, No Drawings

POLY(BUTYLENE TEREPHTHALATE) MOLDING RESIN

This invention relates to compositions suitable for molding, extrusion and the like comprising a poly(1,4-butylene terephthalate)resin and a mineral filler. More particularly, it is concerned with improved such compositions provided by coating individual particles of the filler with an unsintered poly(tetrafluoroethylene) resin.

BACKGROUND OF THE INVENTION

High molecular weight linear polyesters and copolyesters of glycols and terephthalic or isophthalic acid have been available for a number of years. These are described inter alia in Whinfield et al., U.S. Pat. No. 2,465,319, and in Pengilly, U.S. Pat. No. 3,047,539. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Poly(1,4-butylene terephthalate) because of its very rapid crystallization from the melt, is uniquely useful as a component in such compositions. Workpieces molded from such polyester resins, in comparison with other thermoplastics, offer a high degree of surface hardness and abrasion resistance, high gloss and lower surface friction.

It has previously been disclosed by Phipps, Jr., and Wambach, U.S. Pat. No. 4,124,561, that mineral fillers, such as mica, talc or the like can make useful molding compositions with poly(1,4-butylene terephthalate), and that the addition of glass fibers to them improves shatter resistance. Phipps, Jr. and Wambach, U.S. Pat. No. 4,115,333, disclose further that the addition of zinc stearate improves the warp-resistance of compositions comprising poly(1,4-butylene terephthalate), glass and mineral filler, e.g., talc, clay, silica, calcium silicate, mica, and the like. Gasman and Charles, U.S. Pat. No. 4,111,893, disclose that mineral filled poly(1,4-butylene terephthalates) in general are difficult to produce with excellent mechanical properties and have proposed to overcome this by providing the filler, e.g., glass spheres, wollastonite, mica, feldspar, novaculite, kaolin, and the like, with a coating of a difficult to prepare and exotic hydrolysis product of a sulfonyl azido alkyl trimethoxy silane. The disclosures of the above-identified patents are incorporated herein by reference.

Surprisingly, it has now been discovered that poly(tetrafluoroethylene), a readily available resin, is admirably suited to coat mineral fillers prior to mixing them into poly(1,4-butylene terephthalate) resin, if care is taken not to expose the coated particles to sintering temperatures prior to mixing. As will be shown later, mica coated with poly(tetrafluoroethylene) under non-sintering conditions, and then added to poly(1,4-butylene terephthalate) markedly improves important properties in pieces molded from such compositions, particularly impact strength, deformation temperature under load (DTUL), and flexural strength.

DESCRIPTION OF THE INVENTION

According to the present invention, there are provided compositions comprising (i) a poly(1,4-butylene terephthalate) resin; and (ii) a particulate mineral filler, individual particles of said mineral filler being coated with unsintered poly(tetrafluoroethylene) resin.

Poly(1,4-butylene terephthalate) resin, useful in the compositions of this invention include those prepared by the method of U.S. Pat. No. 2,465,319, and described in the other referenced patents. In addition to terephthalic acid units, small amounts, e.g., from 0.5 to 15 percent by weight of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexylenedimethanol, etc., as well as minor amounts of trifunctional, or higher, branching components, e.g., pentaerythritol, trimethyl trimesate, and the like. In addition, the poly(1,4-butylene terephthalate) resin component can also include other high molecular weight resins, in minor amount, such as poly(ethylene terephthalate), block copolyesters of poly(1,4-butylene terephthalate) and aliphatic/aromatic polyesters, etc.

The molecular weight of the poly(1,4-butylene terephthalate) should be sufficiently high to provide an intrinsic viscosity of about 0.6 to 2.0 deciliters per gram, preferably 0.8 to 1.6 dl.g/., measured, for example, as a solution in a 60:40 mixture of phenol and tetrachloroethane at 30° C.

Mineral filler component (i) may be any of the mineral fillers conventionally used in poly(1,4-butylene terephthalate) resin compositions. While particle size and configuration is not considered critical to the invention, filler used preferably has an average particle diameter between about 0.1 and about 500 microns. Suitable fillers include, e.g., glass spheres, acicular wollastonite, mica, feldspar, novaculite, kaolin, etc. Mica is preferred. The amount of coated mineral filler used generally will fall in the range of from about 1 to about 70, preferably from about 15 to about 45, parts by weight per 100 parts by weight of resin (i) and coated filler (ii)

While the amount of poly(tetrafluoroethylene) resin necessary to completely coat the particles of mineral filler for use in this invention will vary somewhat depending in particle size, the resin coating generally comprises from about 1 to about 20 parts by weight per 100 parts by weight of filler.

In addition to poly(1,4-butylene terephthalate) and coated mineral fillers, other resins and additives can be optionally present, such as impact modifiers, glass fibers, lubricants, flame retardants, and the like, in conventional amounts.

Standard methods can be employed to coat the fillers with poly(tetrafluoroethylene)resin, except that any involving a sintering operation must be avoided. It is most convenient to blend the particles of filler with an aqueous emulsion of the resin (e.g., TEFLON aqueous emulsion, 60% solids, available from DuPont), and drying until moisture free. A good ratio is 10 parts of particulate filler to 1 part of 60% emulsion. The damp product dries overnight at 110° C. in a forced draft oven.

The method of blending the compositions of this invention is not critical and can be carried out by conventional techniques. One convenient method comprises blending the polyesters and the filler in powder or granular form, extruding or milling the blend and comminuting into pellets or other suitable shapes. The fillers can also be mixed with resin and additives and directly molded, e.g. by injection or transfer molding techniques.

It is always important to thoroughly free all of the ingredients, the polyester resin, reinforcing filler, and any additives from as much water as possible.

In addition, compounding should be carried out to insure that the residence time in the machine is short; the temperature is carefully controlled; the friction heat is utilized; and an intimate blend between the resin and the additives is obtained.

Although it is not essential, best results are obtained if the ingredients are precompounded, pelletized and then molded. Precompounding can be carried out in conventional equipment. For example, after carefully pre-drying the polyester resin, the fillers and, optionally, other additives and/or reinforcements, e.g., under vacuum at 110° C. for 12 hours, a single screw extruder is fed with a dry blend of the ingredients, the screw employed having a long transition section to insure proper melting. On the other hand, a twin screw extrusion machine, e.g., a 28 mm. Werner Pfleiderer machine can be fed with resins and additives at the feed port and reinforcement down stream. In either case, a generally suitable machine temperature will be about 450° to 600° F.

The precompounded composition can be extruded and cut up in molding compounds, such as conventional granules, pellets, etc., by standard techniques.

The compositions can be molded in any equipment conventionally used for thermoplastic compositions. For example, good results will be obtained in an injection molding machine, e.g., of the Van Dorn type, with conventional cylinder temperatures, e.g., 500° F. and conventional mold temperatures, e.g., 150° F. If necessary, depending on the molding properties of the polyester, the amount of reinforcing filler and the rate of crystallization of the polyester component, those skilled in the art will be able to make the conventional adjustments in molding cycles to accommodate the composition.

DESCRIPTION OF THE PREFERRED EMBODIMENTS

The following examples illustrate the preparation of certain compositions within the scope of this invention. They are not to be construed to limit the invention in any manner whatsoever. All parts, except as otherwise indicated, are by weight.

EXAMPLES 1-4

Mica, 500 g., is placed in a mixing bowl and there is added 50 ml. of a 60% poly(tetrafluoroethylene) emulsion in water (TEFLON 30, DuPont), while blending with a hand-held dough mixer. The damp product is dried overnight in a 110° C. forced draft oven. For comparison purposes, poly(tetrafluoroethylene) resin is coated onto mica, and the resulting product is heated in a muffle furnace to 350° C. for two hours (a sintering step). Six compositions are prepared from poly(1,4-butylene terephthalate) and the coated filler, the uncoated filler and the sintered, coated filler and molded and tested. The formulations used and the properties obtained are set forth in Table 1:

TABLE 1

POLY(1,4-BUTYLENE TEREPHTHALATE)[a] AND POLY (TETRAFLUOROETHYLENE)-COATED MICA[b] (70:30) RATIO BY WEIGHT)

| | EXAMPLE | | | | | |
|---|---|---|---|---|---|---|
| | 1A* | 1 | 1B** | 2 | 3 | 4 |
| Composition | | | | | | |
| % PTFE on mica | 0 | 10 | 10 | 5 | 1 | 0.1 |
| Sintered (yes or no) | No | No | Yes | No | No | No |
| Properties | | | | | | |
| Deflection Temperature Under Load (°F. at 264 psi) | 268 | 305–310 | 250 | 290 | 300 | 240 |
| Izod Impact Strength Notched (Ft.Lbs./In.) | 0.65 | 1.1 | 0.6 | 0.8 | 0.6 | 0.6 |
| Unnotched (Ft.lbs./In.) | 7.4 | 14.6 | 3.9 | 8.0 | 7.0 | 7.0 |
| Flexural Strength ($10^3$ psi) | 16.3 | 17.4 | 14.8 | 17.3 | 16.7 | 16.0 |
| Flexural Modulus ($10^3$ psi) | 747 | 861 | 712 | 840 | 805 | 721 |
| Melt Viscosity ($10^3$ poises, 250° C.) | 9 | 14 | 100 | 13 | 10 | 9 |

*Control
**Comparison
[a]VALOX 310, IV = 1.1 dl/g. General Electric Company
[b]C-1000 Mica, 10–20 microns diameter by 1 micron thick, The English Mica Company, Stamford, Connecticut Remarkable improvements are noted in impact strength, heat distortion temperature and flexural strength over poly (1,4-butylene terephthalate) filled with untreated mica, or with sintered poly(tetrafluoroethylene) resin (PTFE)-coated mica.

EXAMPLES 5-7

The general procedure of Examples 1-4 is repeated substituting other fillers, novacite and glass, for mica. The formulations and results are set forth in Table 2:

TABLE 2

POLY(1,4-BUTYLENE TEREPHTHALATE AND OTHER PTFE-COATED FILLERS (70:30 RATIO BY WEIGHT)

| | Example | | | | | | |
|---|---|---|---|---|---|---|---|
| | 5A* | 5 | 5B** | 5C** | 6A* | 6 | 7 |
| Composition | | | | | | | |
| Filler | ← | ←Novacite[c]→ | | → | ← | ←Glass Fiber[d]→ | → |
| % PTFE on filler | 0 | 5 | 10 | 1 | 0 | 1 | 5 |
| Sintered (yes or no) | No | No | Yes | Yes | No | No | No |
| Properties | | | | | | | |
| DTUL (°F. at 264 psi) | 165 | 168 | 164 | 168 | 398 | 406 | 400 |
| Izod Impact (ft. lbs./in.) | | | | | | | |
| Notched | 0.6 | 0.9 | 0.7 | 0.5 | 2.0 | 1.7 | 1.7 |
| Unnotched | 21 | 21 | 3.3 | 8.2 | 14.0 | 14.0 | 14.0 |
| Flexural Strength ($10^3$ psi) | 15.0 | 14.6 | 11.9 | 13.2 | 25.5 | 26.5 | 24.5 |
| Flexural Modulus ($10^3$ psi) | 530 | 545 | 514 | 550 | 936 | 976 | 880 |
| Melt Viscosity ($10^3$ poises, | | | | | | | |

TABLE 2-continued

POLY(1,4-BUTYLENE TEREPHTHALATE AND OTHER PTFE-COATED FILLERS (70:30 RATIO BY WEIGHT)

| | Example | | | | | | |
|---|---|---|---|---|---|---|---|
| | 5A* | 5 | 5B** | 5C** | 6A* | 6 | 7 |
| 250° C.) | 8 | 12 | 100+ | 8 | 26 | 38 | 23 |

*Control
**Comparison
cDaper Novacite, Malvern Mineral Company
dOCF 419, Owens Corning Glass Company Obviously, other modifications and variations of the present invention are possible in light of the above teachings. It is therefore to be understood that changes may be made in the particular embodiments described which are within the full intended scope of the invention as defined in the appended claims.

I claim:
1. A composition comprising
   (i) a poly(1,4-butylene terephthalate) resin, and
   (ii) a particulate mineral filler, individual particles of said mineral filler being coated with unsintered poly(tetrafluoroethylene) resin.
2. A composition as defined in claim 1 wherein said mineral filler comprises from about 1 to about 70 parts by weight per 100 parts by weight of resin (i) and filler (ii).
3. A composition as defined in claim 2 wherein said mineral filler comprises from about 5 to about 50 parts by weight per 100 parts by weight of resin (i) and filler (ii).
4. A composition as defined in claim 1 wherein said mineral filler comprises mica.

* * * * *